US008515640B2

(12) United States Patent
Monti et al.

(10) Patent No.: US 8,515,640 B2
(45) Date of Patent: Aug. 20, 2013

(54) DEVICE AND METHOD FOR DETERMINING A MAPPING OF THE TORQUE TRANSMITTED BY A CLUTCH IN AN AUTOMOBILE AND HILL-START ASSISTANCE SYSTEM FOR AN AUTOMOBILE EQUIPPED WITH SUCH DEVICE

(75) Inventors: Alessandro Monti, La Garenne Colombes (FR); Richard Pothin, Jouars-Pontchartrain (FR); Christophe Desfriches, Pacy-sur-Eure (FR)

(73) Assignee: Renault S. A. S., Boulogne-Billancourt (FR)

( * ) Notice: Subject to any disclaimer, the term of this patent is extended or adjusted under 35 U.S.C. 154(b) by 565 days.

(21) Appl. No.: 12/675,788

(22) PCT Filed: Jul. 21, 2008

(86) PCT No.: PCT/FR2008/051374
§ 371 (c)(1),
(2), (4) Date: Oct. 20, 2010

(87) PCT Pub. No.: WO2009/030848
PCT Pub. Date: Mar. 12, 2009

(65) Prior Publication Data
US 2011/0046862 A1 Feb. 24, 2011

(30) Foreign Application Priority Data
Aug. 31, 2007 (FR) ...................................... 07 57287

(51) Int. Cl.
*B60W 10/02* (2006.01)

(52) U.S. Cl.
USPC ................... 701/68; 701/36; 701/51; 701/53; 701/55; 701/56; 701/58; 701/67; 192/215; 192/218; 192/219.1; 192/219.7; 477/34; 477/70

(58) Field of Classification Search
None
See application file for complete search history.

(56) References Cited

U.S. PATENT DOCUMENTS

| | | | |
|---|---|---|---|
| 6,358,186 B1 * | 3/2002 | Kosik et al. | 477/176 |
| 6,679,810 B1 * | 1/2004 | Boll et al. | 477/195 |
| 7,032,697 B2 * | 4/2006 | Lee | 180/65.25 |
| 7,502,680 B2 * | 3/2009 | Schmitt | 701/84 |
| 8,090,499 B2 * | 1/2012 | Tamai | 701/38 |
| 8,103,420 B2 * | 1/2012 | Amisano et al. | 701/70 |
| 8,239,107 B2 * | 8/2012 | Mair | 701/67 |
| 2002/0084129 A1 * | 7/2002 | Fritzer et al. | 180/246 |
| 2002/0134637 A1 * | 9/2002 | Salecker et al. | 192/54.1 |
| 2003/0148852 A1 | 8/2003 | Amendt et al. | |
| 2004/0157704 A1 * | 8/2004 | Stork et al. | 477/166 |

(Continued)

FOREIGN PATENT DOCUMENTS

| | | |
|---|---|---|
| EP | 1 630 442 | 3/2006 |
| EP | 1 679 450 | 7/2006 |
| FR | 2 828 450 | 2/2003 |

*Primary Examiner* — Jonathan M Dager
(74) *Attorney, Agent, or Firm* — Oblon, Spivak, McClelland, Maier & Neustadt, L.L.P.

(57) ABSTRACT

A device for determining, when driving a vehicle, a mapping of torque transmitted by a clutch of the automobile based on a position of a clutch control member. The device includes a mechanism updating the mapping based on position thresholds of the clutch control member. The updating modifies values of the thresholds based on minimum and maximum values of the positions of the control member stored in the mapping and on current values of the thresholds.

10 Claims, 3 Drawing Sheets

(56) References Cited

U.S. PATENT DOCUMENTS

| | | | |
|---|---|---|---|
| 2005/0130800 A1* | 6/2005 | Rieger et al. | 477/174 |
| 2005/0261108 A1* | 11/2005 | Kuhstrebe et al. | 477/39 |
| 2006/0037422 A1* | 2/2006 | Kuhstrebe et al. | 74/340 |
| 2006/0079377 A1* | 4/2006 | Steen et al. | 477/186 |
| 2006/0106520 A1* | 5/2006 | Bodin et al. | 701/67 |
| 2006/0142120 A1 | 6/2006 | Amendt et al. | |
| 2008/0039280 A1* | 2/2008 | Petzold et al. | 477/70 |

* cited by examiner

DEVICE AND METHOD FOR DETERMINING A MAPPING OF THE TORQUE TRANSMITTED BY A CLUTCH IN AN AUTOMOBILE AND HILL-START ASSISTANCE SYSTEM FOR AN AUTOMOBILE EQUIPPED WITH SUCH DEVICE

BACKGROUND

The present invention relates to the field of driving assistance, and in particular to starting the vehicle or setting it in motion.

The estimate of the clutch curve, or more precisely of a mapping of the torque transmitted by a clutch fitted to a motor vehicle, can be of use to various systems on board a motor vehicle, and in particular to a system for assisting a hill start of a motor vehicle.

French patent application number 2 828 450 (Renault) relates to a hill-start assistance device for a motor vehicle. The assistance device comprises mainly a means for estimating a slope on which the vehicle is positioned, a means for interpreting the actions of the driver, a means for determining a characteristic curve of the clutch of the vehicle and a means for automatically deactivating a braking means of the vehicle. The motor vehicle can thus be held in position on a slope in a state in which the drive wheels are disengaged from the engine, and can be set in motion in the upslope direction only by the actions of the driver on the accelerator and clutch pedals, without the driver having to act on the parking brake. The assistance device controls the release of the brakes as soon as the torque transmitted to the wheels is sufficient to compensate for the force on the vehicle due to the slope and to gravity.

The mapping of the torque transmitted by a clutch fitted to a motor vehicle is, in a conventional manner, updated, when the vehicle is in motion, by means of predetermined and invariable position thresholds.

Therefore, an incorrect predetermination of these thresholds can cause an incorrect update, and even an absence of an update, of the mapping of the torque transmitted by the clutch.

Moreover, it is possible that the predetermined thresholds are suitable for updating the mapping when the clutch is new, but become unsuitable after a certain degree of wear of the clutch.

BRIEF SUMMARY

One object of the invention is to improve the accuracy of the update of the mapping of the torque transmitted by the clutch with the wear of the clutch.

Another object of the invention is to supply a hill-start assistance system of a motor vehicle having an improved operating precision.

According to one aspect of the invention, a device is proposed for determining, while a vehicle is running, a mapping of the torque transmitted by a clutch fitted to the motor vehicle as a function of the position of a clutch control member. The device comprises means for updating said mapping as a function of position thresholds of the clutch control member. The updating means comprise computing means for modifying the values of said thresholds as a function of the minimum and maximum values of the positions of the control member recorded in said mapping, and of the current value of said thresholds.

Therefore, in addition to the fact that the clutch curve depends on the thresholds, the thresholds also depend on the change in the clutch curve. In other words, the clutch curve and the thresholds are interdependent. The clutch control member may be a clutch pedal.

In one embodiment, the position thresholds comprise a top threshold, a bottom threshold, and an intermediate threshold.

The position of the clutch control member, usually a clutch pedal, can be defined as a percentage of the travel of the clutch pedal, with 0% corresponding to the clutch pedal fully pushed in, that is to say the clutch completely disengaged, and 100% corresponding to the clutch pedal not pushed in or completely released, that is to say the clutch completely engaged.

The top threshold corresponds to a position threshold of the clutch pedal above which or for which the clutch is considered completely engaged, for example 95%. The bottom threshold, for example 5%, corresponds to the position threshold of the clutch pedal below which or for which the clutch is considered completely disengaged. Moreover, an intermediate threshold, for example 80%, is a value for which the clutch is considered not completely engaged, and is used to identify the engaged ratio of the gearbox. Therefore, when the position of the clutch pedal is between the intermediate threshold and the top threshold, the state of the clutch and the determined gearbox ratio depends on the previous state of the clutch, through a phenomenon of hysteresis.

In one embodiment, said updating means comprise a counter of complete updates of said mapping.

Therefore, it is possible, in a cyclical manner, after a predetermined number of complete updates of the clutch mapping, to recompute or update the position thresholds.

In one embodiment, said updating means comprise a comparator of the current value of said counter with a predetermined value.

This predetermined value corresponds to the number of complete updates of the mapping carried out successively before modifying the position thresholds of the clutch pedal.

In one embodiment, the updating means are suitable for executing the computing means when the comparator determines that the current value of said counter is equal to said predetermined value.

According to another aspect of the invention, also proposed is a system for assisting a hill start of a motor vehicle fitted with a device for determining a mapping of the torque transmitted by a clutch as described above, with a slope sensor and a controlled braking device. The hill-start assistance system comprises means for controlling the braking device comprising means for estimating the torque to be supplied by the clutch in order to overcome the forces of gravity, and means for comparing said torque to be supplied and the torque supplied by the clutch available in said mapping.

Therefore, the hill-start assistance system has enhanced precision notably because it takes account of the wear of the clutch.

In one embodiment, said means for controlling the braking device are suitable for controlling the release of the brakes of the braking device when the torque supplied by the clutch is greater than or equal to the torque to be supplied in order to overcome the forces of gravity.

Therefore, during a hill start, the release of the brakes is managed automatically by the vehicle, and the driver can occupy himself only with the accelerator pedal and the clutch pedal, without worrying about the parking brake.

In one embodiment, said means for estimating the torque to be supplied by the clutch in order to overcome the forces of gravity are suitable for computing said torque to be supplied based on the following relation:

$$CT_d = r(b) \cdot \rho_{wheels} \cdot m \cdot g \cdot \sin(\theta_{tilt})$$

in which:

$CT_d$ is the torque to be supplied by the clutch in order to overcome the forces of gravity, in Nm;

r(b) is the gearbox ratio corresponding to the position b of the gearchange lever, adimensional;

$\rho_{wheels}$ is the radius of the wheels of the vehicle, in m;

m is the weight of the vehicle, in kg;

g is the gravitational field on the surface of the Earth, substantially equal to 9.81 m·s$^{-2}$; and $\theta_{tilt}$ is the inclination of the surface on which the vehicle stands, supplied by the slope sensor, in rad.

According to another aspect of the invention, also proposed is a method for determining a mapping of the torque transmitted by a clutch fitted to a motor vehicle as a function of the position of a clutch control member, wherein, while the vehicle is running, said mapping is updated based on position thresholds of the clutch control member while the vehicle is running. In addition, during said update, the values of said thresholds are modified as a function of the minimum and maximum values of the positions of the control member recorded in said mapping, and of the current value of said thresholds.

BRIEF DESCRIPTION OF THE DRAWINGS

The invention will be better understood on studying the following detailed description of a number of embodiments taken as examples that are in no way limiting and illustrated by the appended drawings in which.

DETAILED DESCRIPTION

Figure 1:
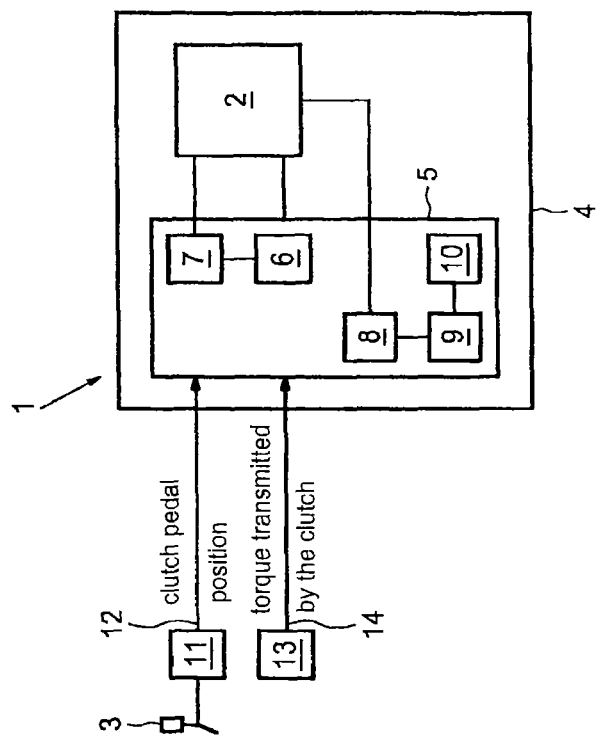
FIG. 1 is a schematic diagram of a device for determining a mapping of the torque transmitted by a clutch fitted to a motor vehicle as a function of the position of a clutch control member, according to one aspect of the invention.

FIG. 1 illustrates an example of a device for determining, while the vehicle is running, a mapping of the torque transmitted by a clutch fitted to a motor vehicle as a function of the position of a clutch control member, in this instance a clutch pedal, according to one aspect of the invention.

The device 1 comprises a mapping 2 of the torque transmitted by the clutch fitted to motor vehicles as a function of the position of the clutch pedal 3 that can be actuated by the driver of the vehicle. The mapping 2 is included in an electronic control unit 4 and can be stored in a memory. The electronic control unit 4 comprises a module 5 for updating the mapping 2. The module 5 for updating the mapping 2 uses position thresholds of the clutch control member, stored in a first memory module 6.

The updating module 5 comprises a computing module 7 making it possible to modify the values of the position thresholds of the clutch pedal 3 as a function of the minimum and maximum values of the positions of the clutch pedal 3 recorded in the clutch mapping 2, and of the current or actual values of the stored thresholds.

A counter 8 makes it possible, at any time, to know the number of complete updates of the mapping 2 that have been carried out since the vehicle was placed in service, based on a predetermined initial mapping 2. Each time the updating module 5 finishes a complete update of the mapping 2, the counter 8 is incremented by one unit.

A comparator 9 compares the current value of the counter 8 with a predetermined value $N_{retro}$ stored in a second memory module 10. Therefore, when $N_{retro}$ successive updates of the mapping 2 have been made, the updating module 5 commands the computing module 7 to modify the values of the thresholds stored in the first memory module 6 as a function of the minimum and maximum values of the positions of the clutch pedal 3 recorded in the clutch mapping 2, and of the current value of the thresholds currently stored in the first memory module 6. The counter 8 is then reset to zero.

The updating module 5 receives an item of information representative of the position of the clutch pedal 3 by a sensor 11 via a connection 12. Moreover, a sensor 13 of the torque transmitted by the clutch delivers to the updating module 5, via a connection 14, an item of information representative of the torque transmitted by the clutch. As a variant, the torque sensor 13 can be replaced by an estimator.

The position of the clutch pedal $\theta_{clutch}$ is expressed in percentages of the maximum travel of the clutch pedal 3. A percentage of 0% corresponds to the clutch completely disengaged, that is to say the clutch pedal 3 pushed in to the maximum, and a percentage of 100% corresponds to the clutch completely engaged, that is to say the clutch pedal 3 completely released. In the mapping 2, the torque values vary between a minimum torque value and a maximum torque value, and this range of torque values is divided into a predetermined number of ranges $N_{range}$. For each of the torque ranges, the device, based on several values measured in this range, determines an average torque for the range i:

$$CC_i(\theta_{clutch\_CC}(i), ECT_{CC}(i)).$$

$\theta_{clutch\_CC}(i)$ represents the average position, in percentage, of the clutch pedal 3 for the current range i, and $ECT_{CC}(i)$ represents the average torque in the current range i, in Nm.

A top threshold $\theta_{clutchHB}$ corresponds to a position of the clutch pedal 3 beyond which the clutch is considered to be engaged, that is to say transmitting torque; the top threshold may for example be 95% initially. A bottom threshold $\theta_{clutchLB}$ is a position threshold of the clutch pedal 3 below which the clutch is considered to be disengaged, that is to say transmitting no torque, for example equal to 5% initially. An intermediate position threshold $\theta_{clutchLB}$, relatively close to the top position threshold $\theta_{clutchHB}$, is also used, for example equal to 80% initially.

In other words, the position thresholds are indexed relative to the clutch curve learned or updated. The evolution of the position thresholds must be much slower than the convergence of the estimate of the clutch mapping 2. For example, the value of the position thresholds can be updated after $N_{retro}$ complete updates of the mapping 2, where, for example, $N_{retro}=30$.

For the bottom position threshold $\theta_{clutchLB}$, a bottom limit $\theta_{clutchLB\ lim\ B}$ and a top limit $\theta_{clutchLB\_lim\ H}$ can be imposed so that, at any time, the following equation is verified:

$$\theta_{clutchLB\ limB} \leq \theta_{clutchLB}(k) \leq \theta_{clutchLB\_lim\ H}$$

in which k represents the number of threshold updates made.

Similarly, for the top position threshold $\theta_{clutchHB}$, a bottom limit $\theta_{clutchHB\ lim\ B}$ and a top limit $\theta_{clutchHB\ lim\ H}$ can be imposed so that, at any time, the following equation is verified:

$$\theta_{clutchHB\_limB} \leq \theta_{clutchHB}(k) \leq \theta_{clutchHB\ lim\ H}$$

Moreover, the following conditions must be satisfied:

$$\begin{cases} 0 < \theta_{clutchLB\_limB} < \theta_{clutchLB\_limH} < 100 \\ 0 < \theta_{clutchHB\_limB} < \theta_{clutchHB\_limH} < 100 \\ \theta_{clutchLB\_limB} < \theta_{clutchHB\_limH} \end{cases}$$

It is also possible to impose a template of the clutch curve, that is to say limit the difference between the top position threshold $\theta_{clutchHB}$ and bottom position threshold $\theta_{clutchLB}$:

$$\Delta\theta_{clutchHBLB\_limB} \leq \theta_{clutchHB}(k) - \theta_{clutchLB}(k) \leq \Delta\theta_{clutchHBLB\_limH}$$

in which:

$$0 < \Delta\theta_{clutchHBLB\ limB} < \Delta\theta_{clutchHBLB\ lim\ H} < 100$$

To take account of the above equations, it is possible to define the following general thresholds:

$$\begin{cases} \theta_{clutchLB\_MIN} = \max(\theta_{clutchLB\_limB}, \theta_{clutchHB}(k) - \Delta\theta_{clutchHBLB\_limH}) \\ \theta_{clutchLB\_MAX} = \min(\theta_{clutchLB\_limH}, \theta_{clutchHB}(k) - \Delta\theta_{clutchHBLB\_limB}) \\ \theta_{clutchHB\_MIN} = \max(\theta_{clutchHB\_limB}, \theta_{clutchLB}(k) + \Delta\theta_{clutchHBLB\_limB}) \\ \theta_{clutchHB\_MAX} = \min(\theta_{clutchHB\_limH}, \theta_{clutchLB}(k) + \Delta\theta_{clutchHBLB\_limH}) \end{cases}$$

Therefore, every $N_{retro}$ updates of the clutch mapping 2, the position thresholds can be updated relative to the minimum value $\theta_{clutchCC\_min}(k)$ and the maximum value $\theta_{clutchCC\_max}(k)$ of the clutch mapping 2 so that:

$$\begin{cases} \theta_{clutchCC\_min}(k) = \min(\theta_{clutchCC}(i)) & i \text{ varying from 1 to } N_{ranges} \\ \theta_{clutchCC\_max}(k) = \max(\theta_{clutchCC}(i)) & i \text{ varying from 1 to } N_{ranges} \end{cases}$$

in which $\theta_{clutchCC}(i)$ is the $i^{th}$ point registered in the clutch mapping 2.

At any time the following is true:

$$\theta \leq \theta_{clutchLB}(k) \leq \theta_{clutchCC\ min}(k) \leq \theta_{clutchCC\ max}(k) \leq \theta_{clutchHB}(k) \leq 100$$

The thresholds, after their $k^{th}$ update, can be computed based on their value before their $k^{th}$ update and after their $k-1^{th}$ update, by means of the following equations:

$$\begin{cases} \theta_{clutchLB}(k) = \min[\max(\alpha_{clutchLB} \cdot \theta_{clutchLB}(k-1) + (1 - \alpha_{clutchLB}) \cdot [\theta_{clutchCCmin}(k-1) - \Delta\theta_{clutchLB}]; \theta_{clutchLB\_MIN}); \theta_{clutchLB\_MAX}] \\ \theta_{clutchHB}(k) = \max[\min(\alpha_{clutchHB} \cdot \theta_{clutchHB}(k-1) + (1 - \alpha_{clutchHB}) \cdot [\theta_{clutchCCmax}(k-1) + \Delta\theta_{clutchHB}]; \theta_{clutchHB\_MAX}); \theta_{clutchHB\_MIN}] \end{cases}$$

in which:

$\alpha_{clutchLB}$ and $\alpha_{clutchHB}$ are factors of convergence of the thresholds verifying:

$$\begin{cases} 0 < \alpha_{clutchLB} \leq 1 \\ 0 < \alpha_{clutchHB} \leq 1 \end{cases}$$

and $\Delta\theta_{clutchLB}$ and $\Delta\theta_{clutchHB}$ are factors of indexation of the position thresholds of the accelerator pedal 3 relative to the clutch curve verifying:

$$\begin{cases} 0 < \Delta\theta_{clutchLB} < 100 \\ 0 < \Delta\theta_{clutchHB} < 100 \end{cases}$$

In a simplified manner, the indexation factors can be considered to be constants. The intermediate position threshold $\theta_{clutchMB}$ can be determined in a simplified manner by the following equation:

$$\theta_{clutchMB}(k) = (\theta_{clutchHB}(k) - \theta_{clutchLB}(k)) * 0.8 + \theta_{clutchLB}(k)$$

in which the intermediate position threshold $\theta_{clutchMB}$ is, for example, equal to 80% of the range [$\theta_{clutchLB}(k)$ $\theta_{clutchHB}(k)$].

To increase the speed of convergence toward the position thresholds suited to the clutch mapping 2 updated, the convergence factors $\alpha_{clutchLB}$, $\alpha_{clutchHB}$ can vary during the use of the vehicle. During the first retrogrades or the first kilometers of the vehicle, it is possible to choose high values for the convergence factors $\alpha_{clutchLB}$, $\alpha_{clutchHB}$. For example, it is possible to choose $\alpha_{clutchLB}=1$ and $\alpha_{clutchHB}=1$; therefore, the clutch curve is learned or updated with constant thresholds; thereafter it is possible to lower the value in order to quickly suit the position thresholds to the clutch mapping 2, and finally it is possible to switch to the default value, lower than but very close to 1, in order to cause the thresholds to evolve very slowly during the use of the vehicle.

Figure 2:
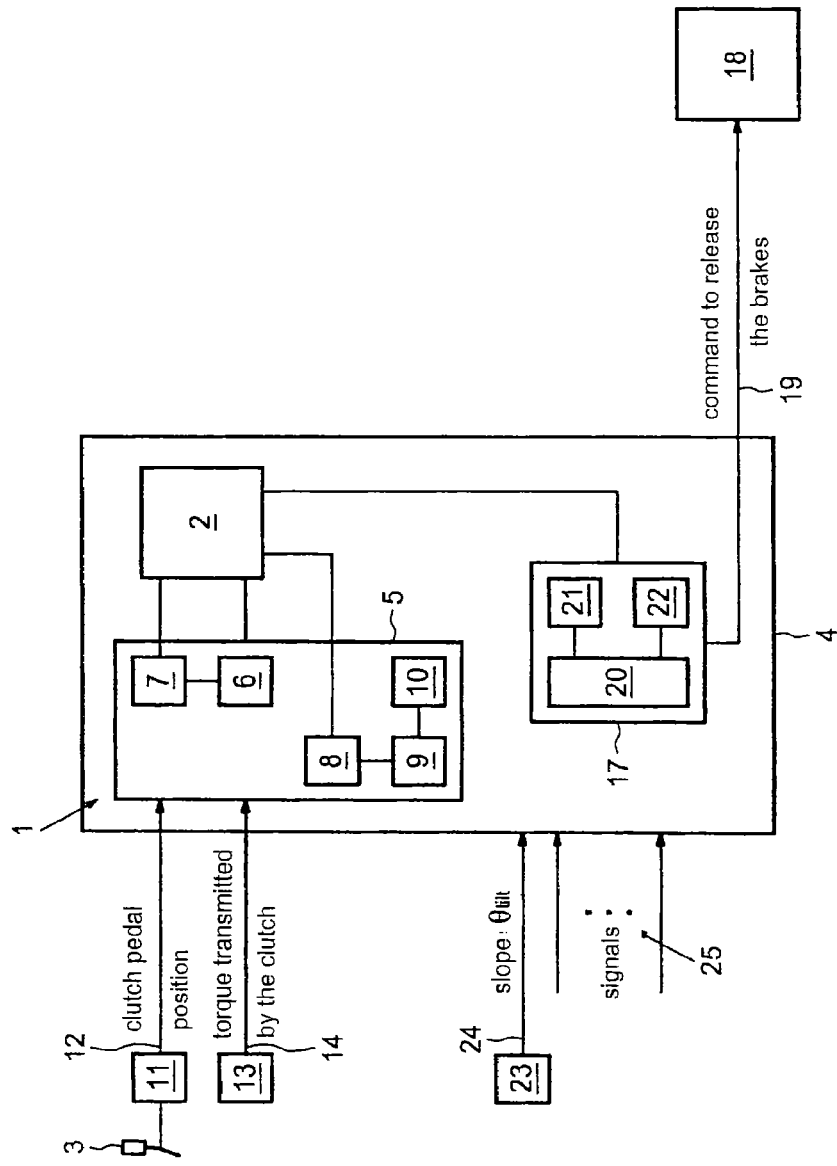
FIG. 2 is a block diagram representing a hill-start assistance system for a motor vehicle fitted with a device according to FIG. 1.
Figure 3:
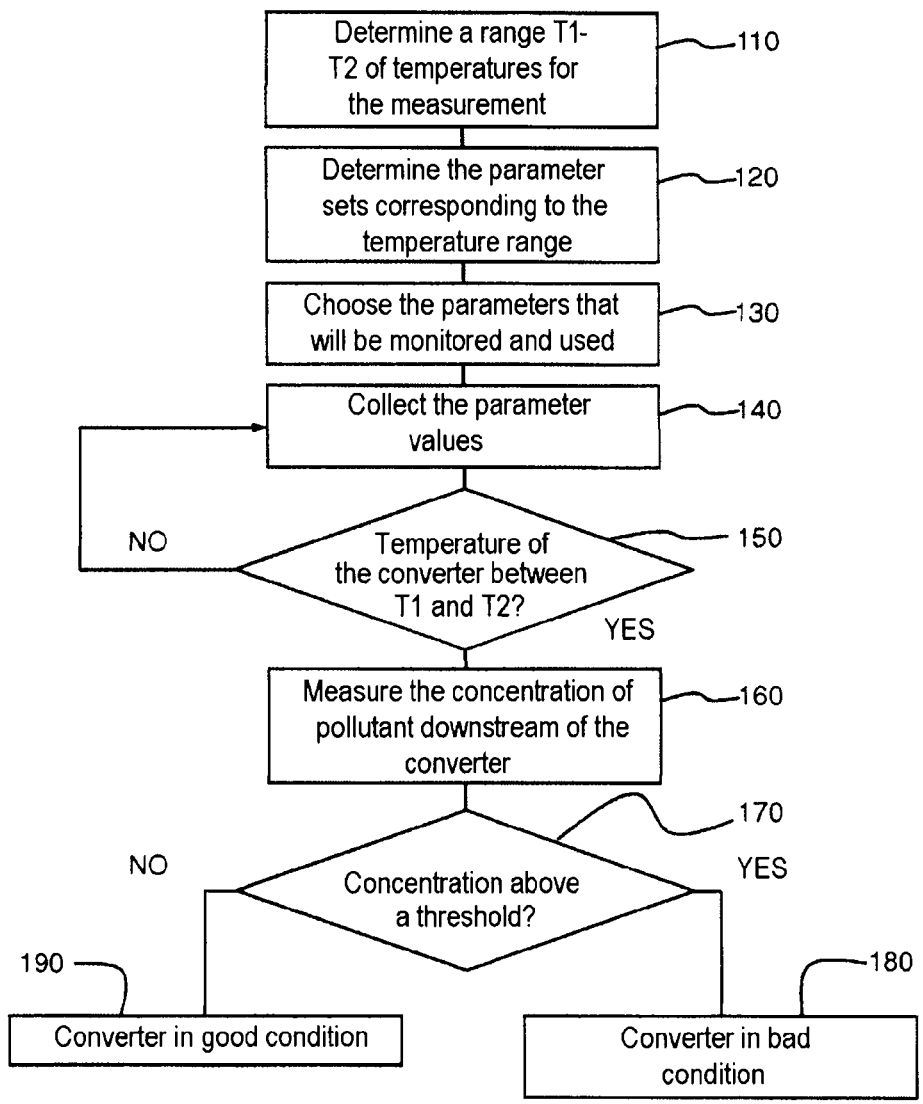

FIG. 2 illustrates an example of a system for assisting a hill start or a hill maneuver of a motor vehicle fitted with a device 1 for determining a mapping of the torque transmitted by a clutch as represented in FIG. 1.

The hill-start assistance system also comprises a control module 17 belonging to the electronic control unit 4 and controlling a braking device 18 so as to release the brakes during a hill start, via a connection 19, when the torque transmitted by the clutch compensates for the effects induced by the slope. The control module 17 comprises a module 20 for estimating the torque to be supplied by the clutch in order to overcome the forces of gravity, and a comparator 21 of the torque to be supplied in order to overcome the forces of gravity and of the torque supplied by the clutch available in the mapping 2. The control module 17 also comprises a module 22 for determining the gearbox ratio corresponding to the position b of the gearchange lever.

Also, the electronic control unit 4 receives an item of information representative of the slope $\theta_{tilt}$ from a slope sensor 23, via a connection 24. The electronic control unit 4 also receives a plurality of other signals 25 supplied by various sensors or estimators on board the vehicle. These signals are representative of the value of various parameters of operation of the vehicle.

During a hill start or maneuver carried out by the driver of the vehicle, the estimation module 20 evaluates the torque to be supplied $CT_d$ to the wheels in order to start, via the following relation:

$$CT_d = r(b) \cdot \rho_{wheels} \cdot m \cdot g \cdot \sin(\theta_{tilt})$$

in which:
$CT_d$ represents the torque to be supplied by the clutch in order to overcome the forces of gravity, in Nm;

r(b) represents the gearbox ratio corresponding to the position b of the gearchange lever, adimensional;

$\rho_{wheels}$ represents the radius of the wheels of the vehicle, in m;

m represents the weight of the vehicle, in kg;

g represents the gravitational field on the surface of the Earth, equal to 9.81 m·s$^{-2}$; and $\theta_{tilt}$ represents the inclination of the surface on which the vehicle stands, supplied by the slope sensor, in rad.

For this computation, the module 22 supplies to the estimation module 20 the gearbox ratio corresponding to the position b of the gearchange lever. The comparator 21 compares the torque to be supplied estimated by the estimation module 20, and the torque supplied by the clutch the value of which is available in the mapping 2. When the torque supplied by the clutch is greater than or equal to the torque to be supplied estimated by the estimation module 20, the control module 17 controls the braking device 18 so as to release the brakes.

The present invention makes it possible to have a clutch mapping updated over time taking account of the wear of the clutch, and thus making it possible to obtain a clutch mapping of enhanced precision.

The invention also makes it possible to supply assistance to the driver for a hill start taking account of the wear of the clutch, and with enhanced precision.

The invention claimed is:

1. A device for determining, while a vehicle is running, a mapping of torque transmitted by a clutch fitted to the vehicle as a function of a position of a clutch control member, the device comprising:

the mapping of torque transmitted by a clutch, the mapping being stored in a memory of an electronic control unit, the mapping including torque values between a minimum torque and a maximum torque as a function of the position of the clutch control member, the torque values being divided into a predetermined number of ranges with an average torque being determined for each of the ranges; and updating means for updating the mapping as a function of position thresholds of the clutch control member, the position thresholds including a top threshold, which is a position of the clutch control member where the torque value is the maximum torque, a bottom threshold, which is a position of the clutch control member where the torque value is the minimum torque, and an intermediate threshold, which is a position of the clutch control member between the top threshold and the bottom threshold, wherein the updating means comprises computing means for modifying values of the position thresholds as a function of the minimum and maximum values of positions of the clutch control member recorded in the mapping, and of current values of the position thresholds, such that the torque values covered by each of the ranges changes when the top and bottom position thresholds change.

2. The device as claimed in claim 1, wherein the updating means comprises a counter of complete updates of the mapping.

3. The device as claimed in claim 2, wherein the updating means comprises a comparator of the current value of the counter with a predetermined value.

4. The device as claimed in claim 3, wherein the updating means is configured to execute computing when the comparator determines that a current value of the counter is equal to the predetermined value.

5. A system for assisting a hill start of a motor vehicle, comprising:

a device for determining, while the vehicle is running, a mapping of torque transmitted by a clutch fitted to the vehicle as a function of a position of a clutch control member, the device comprising:

the mapping of torque transmitted by a clutch, the mapping being stored in a memory of an electronic control unit, the mapping including torque values between a minimum torque and a maximum torque as a function of the position of the clutch control member, the torque values being divided into a predetermined number of ranges with an average torque being determined for each of the ranges, and updating means for updating the mapping as a function of position thresholds of the clutch control member, the position thresholds including a top threshold, which is a position of the clutch control member where the torque value is the maximum torque, a bottom threshold, which is a position of the clutch control member where the torque value is the minimum torque, and an intermediate threshold, which is a position of the clutch control member between the top threshold and the bottom threshold, wherein the updating means comprises computing means for modifying values of the position thresholds as a function of the minimum and maximum values of positions of the clutch control member recorded in the mapping, and of current values of the position thresholds, such that the torque values covered by each of the ranges changes when the top and bottom position thresholds change, a slope sensor;

a controlled braking device;

means for controlling the braking device; and means for estimating the torque to be supplied by the clutch to overcome forces of gravity, and a comparator of the torque to be supplied and of the torque supplied by the clutch, available in the mapping.

6. The system as claimed in claim 5, wherein the means for controlling the braking device is configured to control release of the brakes of the braking device when the torque supplied by the clutch is greater than or equal to the torque to be supplied to overcome the forces of gravity.

7. The system as claimed in claim 5, wherein the means for estimating the torque to be supplied by the clutch to overcome the forces of gravity is configured to compute the torque to be supplied based on the following relation:

$$CT_d = r(b) \cdot \rho_{wheels} \cdot m \cdot g \cdot \sin(\theta_{tilt})$$

in which:

$CT_d$ is the torque to be supplied by the clutch in order to overcome the forces of gravity, in Nm;

r(b) is the gearbox ratio corresponding to the position b of the gearchange lever, adimensional;

$\rho_{wheels}$ represents the radius of the wheels of the vehicle, in m;

m is the weight of the vehicle, in kg;

g is the gravitational field on the surface of the Earth, substantially equal to 9.81 m·s$^{-2}$; and $\theta_{tilt}$ is the inclination of the surface on which the vehicle stands, supplied by the slope sensor, in rad.

8. A method for determining a mapping of torque transmitted by a clutch fitted to a motor vehicle, as a function of a position of a clutch control member, comprising:

mapping of torque transmitted by the clutch, the mapping being stored in a memory of an electronic control unit, the mapping including torque values between a minimum torque and a maximum torque as a function of the position of the clutch control member, the torque values being divided into a predetermined number of ranges with an average torque being determined for each of the ranges; and updating the mapping, while the vehicle is running, based on position thresholds of the clutch control member, the position thresholds including a top threshold, which is a position of the clutch control member where the torque value is the maximum torque, a bottom threshold, which is a position of the clutch control member where the torque value is the minimum torque, and an intermediate threshold, which is a position of the clutch control member between the top threshold and the bottom threshold, wherein during the updating, values of the position thresholds are modified as a function of minimum and maximum values of positions of the clutch control member recorded in the mapping, and of current values of the position thresholds, such that the torque values covered by each of the ranges changes when the top and bottom position thresholds change.

9. The device as claimed in claim 1, wherein the updating means is a module of the electronic control unit.

10. The device as claimed in claim 4, wherein the predetermined value is thirty.

* * * * *